United States Patent Office 2,785,385
Patented Mar. 12, 1957

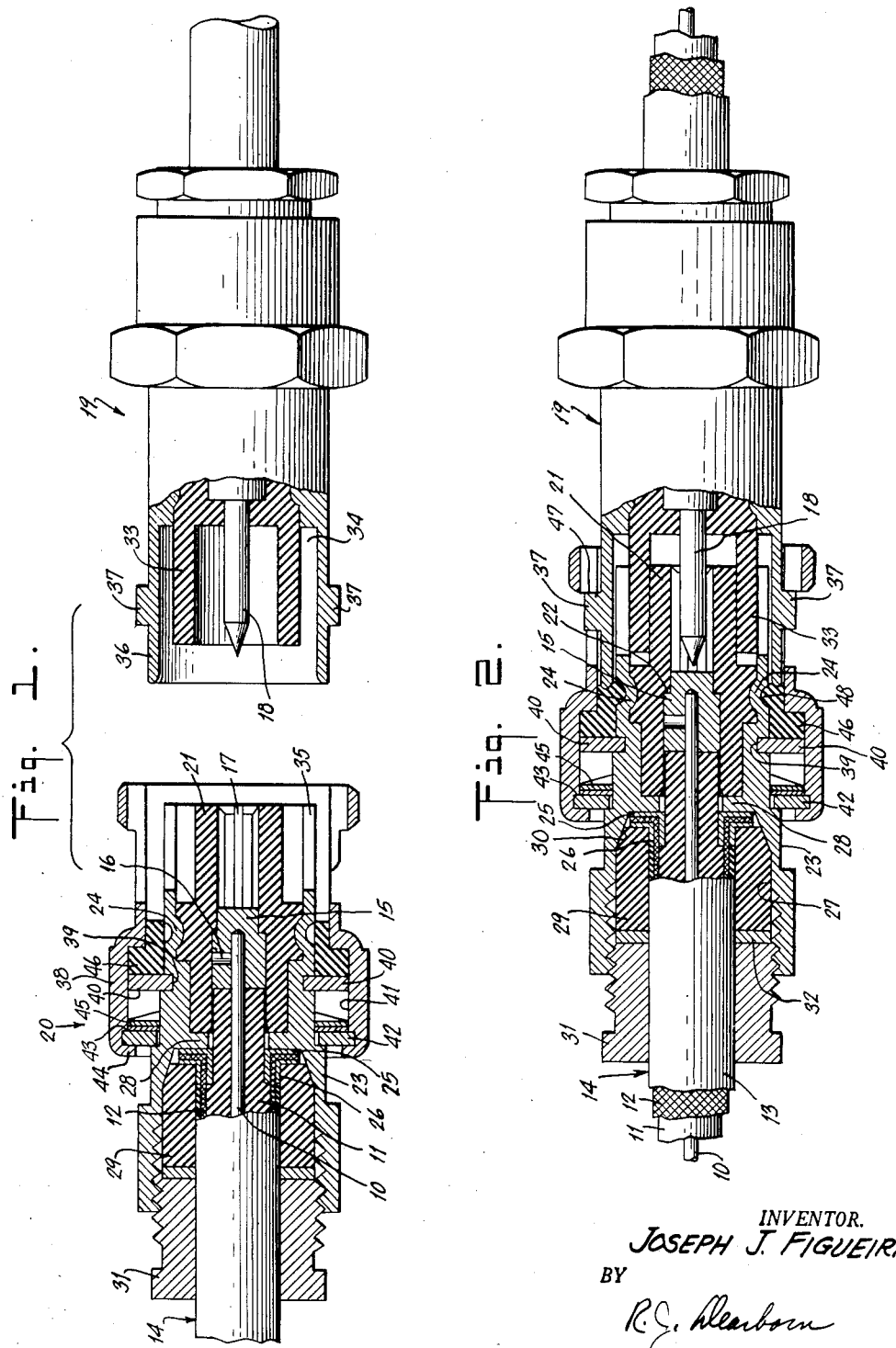

2,785,385

MOISTUREPROOF MEANS FOR CONNECTING A COAXIAL CABLE TO A FITTING

Joseph J. Figueira, Brooklyn, N. Y., assignor to The Liquidometer Corporation, Long Island City, N. Y., a corporation of Delaware Application February 23, 1955, Serial No. 490,045

1 Claim. (Cl. 339—94)

The present invention relates to a moistureproof electrical connector means and more particularly to cooperating fittings arranged to be connected together for connecting one or a plurality of electrical conductors in one such fitting to other conductors respectively, which are associated with the other of said fittings.

It has been found in connection with the use of relatively small fittings, particularly those used in conjunction with coaxial cables of relatively small sizes, that moisture has tended to penetrate into the inside portions of cooperating connector fittings, causing a failure of the fittings by shorting the electric circuits connected thereby or in some other similar manner. This difficulty has been solved in accordance with the present invention by the provision of a quite specific construction peculiarly adapted to cooperating connector fittings in which each fitting comprises a body portion having a forwardly directed (i. e. toward the cooperating fitting) cup-shaped portion and wherein in a first of said fittings there is arranged an annular clamp member around the body member thereof, this clamp member being arranged for limited axial sliding movement on said body member. The body member of this first fitting is provided with an outstanding flange, which may be formed as two semi-annular portions fitting into an annular groove and which is received slidingly inside a substantially cylindrical portion of the clamp member. Resilient means are further provided, such as annular spring washers or the like, for urging the clamp member rearwardly with respect to the fitting with which it is associated. The forward portion of this clamp member and the forwardly directed cup-shaped portion of the body member of the fitting are spaced apart in a radial direction to provide therebetween a forwardly-opening annular slot for the reception of the forwardly directed cup-shaped portion of the cooperating fitting. Seated against the aforesaid flange on the body member of the first fitting and inside the clamp member which is slidably mounted thereon as aforesaid, is an annular body of a deformable material, such as rubber, which is preferably L-shaped in cross-section and which defines the inner end of the forwardly-opening annular slot aforesaid, so that when the cooperating fittings are brought together in their normal connected position, the forward edge of the cup-shaped portion of the second fitting will penetrate into and exert axial pressure upon the deformable member of rubber or the like, so as to cause this member by a flow deformation to fill all the interstices contiguous therewith and so as positively to prevent ingress of moisture from outside the connected fittings into the central portion inside the telescoped cup-shaped portions thereof. This construction in practice makes for a substantially moisture proof fitting in accordance with the present invention.

The present invention is, however, disclosed as a part only of a complete fitting construction including as other subject matter a means for connecting a coaxial cable to at least one of the fittings and for effecting a moistureproof connection between the coaxial cable and the fitting. This other subject matter, while disclosed herein for completeness of disclosure, forms no part of the present invention, but is the invention of one Arthur Wickesser, which is set forth in his application Serial No. 490,044, filed February 23, 1955.

The invention may best be understood by reference to the accompanying drawings, in which:

Figure 1 shows a connector fitting in accordance with the present invention at the left and spaced therefrom at the right a cooperating fitting which may also be constructed in accordance with the present invention, the fitting at the left and a portion of the cooperating fitting being shown in central longitudinal section and the remainder of the parts being shown in elevation; and Fig. 2 is a view similar to Fig. 1 but with the cooperating fittings in the relative positions they occupy when they are connected one to the other.

The cable itself, the construction of which per se forms no part of the present invention, is shown as comprising a central conductor 10, surrounding which is an annular layer of insulating material 11, herein referred to as an inner insulating layer. While any suitable insulating material may be used, some of the smaller size coaxial cables, such as those of .090 and .123 inch diameter, employ as the insulating material 11 a polymer of tetrafluoro-ethylene, which has excellent electrical insulating and heat resisting properties. Surrounding the inner insulating layer is an outer conductor 12 of braided metallic filaments, which provides the maximum resistance to tensile stresses of any of the elements making up the cable. Surrounding the braided metallic conductor 12 is an outer insulating layer 13 of any desired material. The parts 10 to 13, inclusive, collectively make up the coaxial cable, which is generally indicated at 14.

Cable 14 is cut back so as to bare an outer end portion of the inner conductor 10 which may then be soldered or otherwise secured to a central contact member 15, this member being provided with a lateral hole 16 through which solder may be flowed into the recess into which the end of the central conductor 10 projects as shown in Fig. 1. The hole 16 also acts as a vent for air trapped by pushing a wire into the hole in contact member 16 and also may serve for outflow of excess solder. The outer end portion of the contact member 15 may be formed as a cup-shaped portion 17, as shown, for engagement with a stud member 18 of the cooperating fitting generally indicated at 19. Alternatively, the shapes of these members 15 and 18 may be interchanged, so that either may be the plug member and either the socket member. The construction of the remaining portion of the fitting 19 or the remaining portion of the left hand fitting shown generally at 20 may be otherwise identical irrespective of the particular type of central contact member which is used. It will be understood that a fitting embodying the present invention may be connected to a cooperating fitting part as the sectionalized portion shown in the drawings of the fitting 20, whether that part be a portion of a fitting connected to a piece of coaxial cable as shown or whether it be connected to and carried by some rigid part as a piece of electrical apparatus. The central member 15 including the portion 17 thereof is surrounded by a member 21 of suitable insulating material, which may be either of an organic plastic nature as the material 11 for example, or may be ceramic in character. The member 21 has an internal shoulder 22 engaging a correspondingly shaped external shoulder on the center contact member 15. This prevents movement of the member 15 to the right as seen in Figs. 1 and 2, while movement thereof to the left is prevented by the engagement of the left hand end of the member 15 as shown in the drawings with the insulating layer 11 of the cable 14, which is secured thereto by soldering the center conductor 10 into the member 15 as aforesaid. The insulating member 21 is secured within an annular body member 23 of the fitting by a number of depressed portions or stake points 24 of the member 23 entering into depressed portions of the member 21 as shown, these portions or stake points being provided in an annular series, only two of which are shown on the drawings, but four or more of which may be provided. These depressed portions or stake points may be formed at the factory where the fitting is produced, so as to anchor the insulating material 21 in place in the body member 23, the center contact 15 being inserted into these members 21—23 after this center contact 15 has been secured to the center conductor of the cable 14 as aforesaid.

The braided outer metallic conductor 12 has its end portion received between a first eyelet member 25 and a second eyelet member 26, each of these eyelet members having cylindrical sleeve portions arranged to be received one within the other and outwardly extending flange portions. The two eyelet members are of such relative sizes that when they are disposed in nested position embracing the end portion of the braided metallic conductor 12, the filaments of this conductor are in metal-to-metal frictional contact both between the cylindrical portions of the eyelet members 25 and 26 and between the flange portions thereof.

Once the eyelet members 25 and 26 have been placed in position as shown with respect to the coaxial cable 14 and the center conductor 10 thereof has been secured to the center contact member 15, the cable and center contact member may be inserted into the interior of the body member 23 of the fitting with the nested eyelet members seated against the right hand end or innermost portion of a recess or chamber 27 opening to the left of the fitting, which is generally considered as to the rear thereof, i. e. the end into which the cable to be connected is inserted. In order to provide a seat for the nested eyelet members, the body member 23 of the fitting is provided with an inwardly directed annular flange 28 which forms the inner end of the recess or chamber 27. This limits movement of the nested eyelet members and of the cable to the right with respect to the body member 23, as seen in the accompanying drawings.

Means are provided for holding the nested eyelet members against their seat formed by the flange 28, such means in the present instance comprising a member 29 of a rubber or rubber composition material, which may be deformed under pressure and which under sufficient pressure will flow to fill any interstices or spaces available thereto. This member 29 is disposed within the recess or chamber 27, which recess or chamber is provided with an inner, progressively constricted zone 30 of progressively less radial dimension as it approaches the seat-forming end of the recess or chamber 27. This deformable member 29 has an axial dimension (horizontally as seen in the accompanying drawings), which is substantially greater than the radial thickness thereof (vertically on the drawing), which is an essential relationship in accordance with the experience had with devices of this kind in order to secure a necessary degree of resistance against humidity or moisture.

Means are provided for exerting axial pressure upon the member 29 to force it into the constricted portion 30 of the recess or chamber 27 and against the nested eyelet portions and also against the outside of the cable 14. For this purpose there is provided an annular nut 31 which has external threads meshing with internal threads in the outer end portion of the wall forming the recess or chamber 27. This nut thus acts as a gland nut in exerting deforming pressure upon the member 29, to the right as seen in the drawings. Disposed intermediate the end of the nut 31 and the deformable member 29 is an annular washer 32, which is useful in practice to prevent the rotation imparted to the nut 31 in tightening it from distorting the member 29 by torsional forces. The general purpose, therefore, of the members 31 and 32 is that they are jointly effective to exert axial pressure upon the deformable member 29, so as to cause it to secure the nested eyelet members in position as shown and also to fill any spaces or passages through which moisture could penetrate into the inner end of the recess or chamber 27, so as to short the cable or cause any damage thereto incident to the presence of humidity or moisture.

Considering now the relationship of the parts of the cooperating fittings 19 and 20, the fitting 19 has an annular insulating member 33, which has a function generally similar to that of the member 21 and which is essentially the same as the member 21 with the exception of the shape of the outer end portion thereof which is directed toward the cooperating fitting 20. This outer end portion is cup-shaped as shown and has an inside diameter sufficient to encompass the outside diameter of the forward portion of the member 21 as shown particularly in Fig. 2, in which the parts are shown in their connected position.

Further, in the fitting 19 there is an annular recess 34, which is opposite the axially slotted end portion 35 of the body member 20, so that the portion 35 projects into the recess 34 at the connected position of the parts as shown in Fig. 2. It will be understood that in the normal use of the connectors, the braided conductor 12 is grounded, so that this conductor, the eyelet members 25 and 26 and the body 23 of the fitting 20 are all at ground potential. The axial slotting of the portion 35 of the body 23 is normally done to give a spring ground connection between the fittings 19 and 20, the slit sections of the portion 35 coming into contact with an annular portion 36 of the body member of the fitting 19, which has an inside diameter sufficient to encompass the portion 35.

While it is contemplated that various schemes, all of which as far as is known have been used in one device or another, may be employed for holding the fittings 19 and 20 together, there is illustrated in the accompanying drawings a bayonet type connection including two or more outwardly extending studs as shown at 37 for the fitting 19 which are cooperable with a suitably formed clamp member 38, which is arranged for limited axial sliding movement on and outside of the body member 23 of the fitting 20. For this purpose the body member 23 is provided with an annular groove 39. Seated in this groove are a pair of semi-annular members 40, which together form the equivalent of an annular washer and which are in sliding contact at their outer periphery with an inner cylindrical portion 41 of the clamp member 38. There is also received in the left hand portion (as seen in the drawings) of the clamp member 38 an annular washer 42, which is first seated against a shoulder 43 in the member 38 and then is secured in its position by spinning over the washer 42 a peripheral end portion 44 of the clamp member 38, so that as to hold all the parts in the positions shown in the drawings. Disposed between the washer 42 and the pair of semi-annular members 40 are one or more spring washers 45, which bear against the washer 42 on the left and the semi-annular washer members 40 on the right (both as shown in the accompanying drawings) and thus urge the clamp member 38 to the left as seen in the drawings.

Movement of the clamp member 38 to the left beyond the position shown in Fig. 1 is prevented by an annular deformable gasket member 46 of rubber or rubber composition material, which is substantially L-shaped in cross-section as shown in Fig. 1 and which has an axial dimension as to its inner portion at least as great as its greatest radial dimension. Thus, as seen in Fig. 1, the clamp member 38 is urged to the left by the spring washers 45, but cannot move beyond the position shown in Fig. 1 without distorting or deforming the member 46. The spring washers are not sufficiently powerful to effect such distortion, so that the parts have a normal position as shown in Fig. 1.

The arrangement is such that when the cooperating fittings 19 and 20 are brought together to engage the lugs 37 behind shoulders as shown at 47 in Fig. 2, the portion 36 of the body member of fitting 19 enters into what may be termed a forwardly-opening annular slot formed between the forward portion of the member 38 and the portion 35 of the body member 23, the forward edge portion of the part 36 of the body of the fitting 19 pressing into the right hand portion as seen in the drawings of the deformable member 46. Then due to the deformable and somewhat flowable character of this member 46, the material thereof is caused to move into and completely to fill all accessible spaces and interstices including, for example, the depressions formed at the stake points 24 as shown at 48 in Fig. 2. This, combined with the peculiar shape of the member 46 and the relative dimensions thereof, effects a tight sealing between the clamp member 38 on the one hand and the body portion 23 of the fitting 20 on the other, notwithstanding the slight movement to the right (as seen in the drawing) of the clamp member 38 under the influence of the force applied between the lugs 37 and the cooperating shoulders at 47 and against the tension of the spring washers 45. This in turn results in the practical weatherproofing of this portion of the fittings.

It is contemplated that the novel moisture proofing provisions of the present invention, i. e. those which have to do with the use of the member 46 and its associated parts, may be used independently of devices using a moisture proofing member as shown at 29 and as hereinabove described; in other words, either could be used without the other, as each contributes its own part to the over-all result.

While there is herein shown and described but one principal form of the present invention, and certain alternatives have been indicated as the description proceeded, other equivalents and alternatives will suggest themselves to those skilled in the art from the foregoing disclosure. I do not wish to be limited, therefore, except by the scope of the appended claim, which is to be construed validly as broadly as the state of the prior art permits.

What is claimed is:

Moistureproof electrical connector means, comprising a first fitting and a second fitting arranged to be removably connected together to effect a connection between respectively associated electrical conductive means, each said fitting including a body member and each said body member having a cup-shaped portion directed toward a forward end of each fitting respectively, the forward ends of said fittings being those arranged to engage each other in effecting a connection between said fittings, at least one electrical contact means in one of said fittings within and electrically insulated from the cup-shaped portion thereof and arranged to make electrical connection with respectively corresponding electrical contact means within and electrically insulated from the cup-shaped portion of the other of said fittings; an annular clamp member mounted for limited axial sliding movement on the body member of said first fitting and arranged to cooperate with clamping means on said second fitting so as removably to hold the two fittings in their connected relation to each other, flange means carried by the body member of said first fitting for positioning said clamp member thereon, means for resiliently urging said clamp member rearwardly with respect to the body member of said first fitting, a forwardly extending portion of said clamp member and said cup-shaped portion of said body member of said first fitting defining therebetween an annular slot for telescopically receiving the forward end of the cup-shaped portion of the body member of said second fitting, and a moistureproofing member of deformable material disposed against said flange means and defining the inner end of said annular slot, said moistureproofing member being substantially L-shaped in cross-section and having an axial dimension at least as great as its radial dimension, and in which said moistureproofing member is so disposed that, as seen in cross section, the juncture of the two legs of the L is adjacent to the intersection of said flange and the cup-shaped portion of said first fitting, so that a first leg of the L extends axially along the outside of the cup-shaped portion of said first fitting and the second leg of the L extends axially outwardly along said flange; and the parts aforesaid being so dimensioned that when said fittings are in their connected relation to each other, the forward end of the cup-shaped portion of the body member of said second fitting will extend into and exert axial deforming pressure on the end of said first leg of said moistureproofing member, causing it to fill all available spaces adjacent thereto and preventing ingress of moisture from outside said fittings into the space between their telescoped cup-shaped portions.

References Cited in the file of this patent
UNITED STATES PATENTS 2,540,012   Salati _____ Jan. 30, 1951
2,673,233   Salisbury _____ Mar. 23, 1954